(12) United States Patent
Yudanov

(10) Patent No.: US 11,988,179 B2
(45) Date of Patent: May 21, 2024

(54) FUEL INJECTION SYSTEM

(71) Applicant: Volvo Truck Corporation, Gothenburg (SE)

(72) Inventor: Sergi Yudanov, Västra Frölunda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/638,532

(22) PCT Filed: Aug. 29, 2019

(86) PCT No.: PCT/EP2019/073041
§ 371 (c)(1),
(2) Date: Feb. 25, 2022

(87) PCT Pub. No.: WO2021/037365
PCT Pub. Date: Mar. 4, 2021

(65) Prior Publication Data
US 2022/0356859 A1 Nov. 10, 2022

(51) Int. Cl.
*F02M 47/02* (2006.01)
*F02M 55/00* (2006.01)
*F02M 59/36* (2006.01)

(52) U.S. Cl.
CPC ........ *F02M 47/027* (2013.01); *F02M 55/002* (2013.01); *F02M 59/366* (2013.01)

(58) Field of Classification Search
CPC ............... F02M 47/027; F02M 55/002; F02M 63/0029; F02M 47/02
See application file for complete search history.

(56) References Cited

U.S. PATENT DOCUMENTS 6,675,773 B1 * 1/2004 Mahr ................... F02M 59/105
 123/456
7,549,410 B2 * 6/2009 Yudanov .............. F02M 61/205
 123/514

(Continued)

FOREIGN PATENT DOCUMENTS

WO 2009110820 A1 9/2009
WO WO-2009110820 A1 * 9/2009 ......... F02M 21/0245
WO 2014023317 A1 2/2014

OTHER PUBLICATIONS

International Search Report and Written Opinion of the International Searching Authority, PCT/EP2019/073041, dated May 15, 2020, 12 pages.

*Primary Examiner* — Sizo B Vilakazi
*Assistant Examiner* — Brian R Kirby
(74) *Attorney, Agent, or Firm* — Sage Patent Group

(57) ABSTRACT

A fuel injection system includes a first high pressure fuel source, a return channel connected to a second low pressure fuel source, a residual pressure regulator having an inlet and an outlet connected to the return channel, and a fuel injector having a control valve arrangement comprising an inlet, an outlet and a return port, a fuel injection nozzle having an outlet chamber, an injection outlet, and a needle member in the outlet chamber. The needle member is biased to a closed position to block fluid communication between the outlet chamber and the injection outlet, and to open fluid communication by a pressure in the outlet chamber. The residual pressure regulator is connected to a spill valve to regulate pressure to a residual pressure higher than the pressure in the return channel and lower than the pressure of the first fuel source.

12 Claims, 4 Drawing Sheets

(56) References Cited

U.S. PATENT DOCUMENTS

| | | | |
|---|---|---|---|
| 2004/0255908 A1* | 12/2004 | Udd | F02M 63/0225 |
| | | | 123/446 |
| 2005/0000493 A1* | 1/2005 | Yudanov | F02M 63/0007 |
| | | | 123/446 |
| 2005/0016499 A1* | 1/2005 | Noda | F02M 59/462 |
| | | | 123/364 |
| 2005/0045149 A1* | 3/2005 | Udd | F02M 45/02 |
| | | | 123/446 |
| 2006/0102153 A1* | 5/2006 | Oda | F02M 55/002 |
| | | | 123/468 |
| 2008/0202471 A1* | 8/2008 | Yudanov | F02M 55/002 |
| | | | 123/456 |
| 2008/0308064 A1* | 12/2008 | Yudanov | F02M 45/02 |
| | | | 123/296 |
| 2009/0095258 A1* | 4/2009 | Yudanov | F02M 63/0007 |
| | | | 123/456 |
| 2011/0005494 A1* | 1/2011 | Yudanov | F02M 63/0029 |
| | | | 123/456 |
| 2014/0102414 A1* | 4/2014 | Kato | F02M 55/04 |
| | | | 123/446 |
| 2014/0182553 A1* | 7/2014 | Lee | F02M 63/029 |
| | | | 123/456 |
| 2015/0068496 A1* | 3/2015 | Yudanov | F02M 63/0005 |
| | | | 123/456 |
| 2015/0176555 A1* | 6/2015 | Yudanov | F02M 47/02 |
| | | | 239/584 |
| 2016/0003199 A1* | 1/2016 | Kato | F02M 53/06 |
| | | | 123/495 |

* cited by examiner

FUEL INJECTION SYSTEM

CROSS REFERENCE TO RELATED APPLICATIONS

This application is a 35 U.S.C. § 371 national stage application of PCT International Application No. PCT/EP2019/073041 filed on Aug. 29, 2019, the disclosure and content of which is incorporated by reference herein in its entirety.

TECHNICAL FIELD

The invention relates to a fuel injection system for an internal combustion engine and/or to a vehicle comprising the fuel injection system.

The invention can be applied in heavy-duty vehicles, such as trucks, buses and construction equipment.

BACKGROUND

In fluid power applications, flow control systems are important constituents that directly define accuracy, reliability, efficiency and cost of the device/installation they belong to. Correspondingly, a flow control system must consume a minimum of energy to control the given fluid power, while being inexpensive, simple, reliable and durable and fulfilling the necessary control accuracy demands. One example of an especially demanding application for a flow control system is a diesel fuel injector. Another example of a demanding application for a flow control system is a DME (Dimethyl ether) diesel fuel injector. Contemporary diesel fuel injection systems of, for instance, a heavy-duty truck engine are required to deliver high hydraulic power in extraordinarily short bursts with an almost unthinkable accuracy: an instantaneous fluid power in the order of 40 kW can be routinely achieved, its delivery precisely controlled and then fully terminated, all within about 1 ms time slot or less. A fuel injector must keep doing this for up to a billion cycles safely and efficiently while retaining as good controllability as ever over its lifetime. At the same time, being a significant contributor to the overall cost of the engine, the fuel injection system is receiving correspondingly high cost reduction attention. It must also be energy efficient, in order for the engine as a whole to attain good fuel economy, whilst affording sufficiently good controllability to allow efficient and clean combustion of the fuel.

The fuel injection system may include a hydraulic control system which is adapted for controlling a fuel injector nozzle for injecting fuel into the engine. For highly volatile fuels, such as DME, a critical state may be reached when the engine is heated up to high temperatures. The hydraulic control system of the fuel injection system may then not function properly, or it may require difficult-to-use hardware configurations for avoidance of such problems. In particular, a valve that is designed to relieve pressure in a control chamber would need to open a bigger flow area to achieve a certain target pressure drop. Generally speaking, the bigger the required flow area, the more difficult it is to meet other functional and design requirements, such as the response time, the energy demands to operate the valve, etc.

SUMMARY

In view of the above, an object of the invention is to provide a fuel injection system for an internal combustion engine which provides a good alternative to known designs and/or which at least in some aspect alleviates at least one of the drawbacks of the prior art.

According to a first aspect of the invention, the object is achieved by a fuel injection system for an internal combustion engine according to claim 1. According to a second aspect of the invention, the object is achieved by a vehicle according to claim 12.

According to the first aspect thereof, the object is achieved by a fuel injection system for an internal combustion engine, comprising:
 a first fuel source for providing fuel of a relatively high pressure;
 a return channel connected to a second fuel source for accommodating fuel of relatively low pressure in relation to the pressure of the fuel provided from the first fuel source;
 a residual pressure regulator comprising an inlet and an outlet, which outlet is connected to the return channel;
 a fuel injector comprising an inlet channel connected to the first fuel source, a control valve arrangement comprising an inlet, an outlet and a return port, whereby the inlet of the control valve arrangement is connected to the inlet channel and the outlet of the control valve arrangement is connected to an outlet channel, wherein the fuel injector further comprises a fuel injection nozzle comprising an outlet chamber connected to the outlet channel, an injection outlet connected to the outlet chamber and a needle member,
wherein the needle member is at least partially provided in the outlet chamber and biased at least partially by a biasing member to a nozzle closed position whereby fluid communication between the outlet chamber and the injection outlet is blocked, and
wherein the fuel injection nozzle is configured such that the needle member is biased to open fluid communication between the outlet chamber and the injection outlet by a pressure in the outlet chamber; and
wherein the fuel injection system further comprises:
 a spill valve provided between the outlet channel and the return channel, wherein the residual pressure regulator is connected by its inlet to the spill valve and configured to regulate pressure at its inlet to a residual pressure that is higher than the pressure in the return channel but lower than the pressure of the first fuel source, wherein further the return port is connected to the return channel downstream the residual pressure regulator.

By the provision of the present invention, an efficient fuel injection system is provided in a cost-efficient manner. More particularly, a favourably big pressure drop can be provided by referencing the control valve arrangement to the return port whilst the pressure regulator is set to control the residual pressure in the outlet channel so that it is low enough to reduce the risk of leakage in case of loss of hydraulic tightness in the closed fuel injection nozzle, but high enough to prevent excessive boiling of e.g. DME fuel. In fact, it has been realized that the above effects can be advantageously provided by the configuration of the fuel injection system as set forth herein.

The present invention may be used in fuel injectors working with various types of fuels, such as diesel and highly volatile fuels, such as the aforementioned DME fuel. However, the present invention is preferably used for highly volatile fuels.

Optionally, the fuel injection nozzle may be configured to open fluid communication between the outlet chamber and the injection outlet when the pressure in the outlet chamber is at or above a predetermined nozzle opening pressure, further wherein the residual pressure may be set lower than the predetermined nozzle opening pressure. Thereby the risk of fuel leakage between consecutive fuel injection events may be reduced since the pressure regulator controls that the outlet chamber pressure falls below the predetermined nozzle opening pressure between the consecutive fuel injection events. Still optionally, the fuel injection nozzle may be configured to close when the pressure in the outlet chamber is at or below a predetermined nozzle closing pressure, further wherein the residual pressure may be set lower than the predetermined nozzle closing pressure. This configuration may further reduce the risk of fuel leakage between consecutive fuel injection events.

Optionally, the residual pressure may be set to a level between 25 and 65 bar. This has shown to be an advantageous pressure level for reducing the risk of fuel leakage but also so that it is high enough to prevent excessive boiling of e.g. DME fuel between consecutive fuel injection events.

Optionally, the pressure regulator may be designed to vary the residual pressure depending on such factors as the engine operating condition, for instance it may be an electronically controlled pressure regulator.

Optionally, the control valve arrangement may further comprise a nozzle control member and a fuel outlet chamber which connects the inlet and the outlet of the control valve arrangement, wherein the nozzle control member is at least partially arranged in the fuel outlet chamber and configured to be moveable for selectively allowing pressurized fuel into the outlet channel, wherein the control valve arrangement further comprises a fuel control chamber configured such that a pressure therein biases the nozzle control member towards a closed position in which pressurized fuel is prevented from being allowed into the outlet channel, wherein the fuel control chamber is connected to the return port, and wherein the control valve arrangement further comprises a valve member configured to be moveable for selectively opening and closing a flow passage between the fuel control chamber and the return port.

Optionally, the control valve arrangement may further comprise a moveable member, whereby at least the moveable member and the nozzle control member define the fuel control chamber. Still optionally, the moveable member may be configured to be moveable towards and away from the nozzle control member and to raise pressure in the fuel control chamber when moved towards the nozzle control member, and wherein the valve member is biased towards the moveable member for closing the flow passage and for moving the moveable member towards the nozzle control member. This configuration has shown to provide a cost-efficient system providing fuel injections with minimized internal fuel leakage and with shortened response times.

Optionally, the valve member may be part of an electronically controlled valve, such as a solenoid valve.

Optionally, the fuel injection system may further comprise a biasing member biasing the nozzle control member towards its closed position. The resilient member may be a spring, such as a coil spring.

Optionally, the fuel injection system may further comprise a fuel connection between the inlet channel and the fuel control chamber for pressurizing the fuel control chamber. Still optionally, the fuel connection may comprise a hydraulic restrictor for restricting the flow of fuel from the inlet channel to the fuel control chamber. This configuration may facilitate that the pressure in the fuel control chamber drops to a level so that a positive pressure difference between the fuel outlet chamber and the fuel control chamber is provided when the flow passage is opened by the valve member. The positive pressure difference may then overcome a force from e.g. the above mentioned resilient member so that the nozzle control member opens the connection between the fuel outlet chamber and the outlet channel.

According to the second aspect thereof, the object is achieved by a vehicle comprising the fuel injection system according to any one of the embodiments of the first aspect of the invention.

Advantages and effects provided by the second aspect of the invention are largely analogous to the advantages and effects as provided by the fuel injection system according to the embodiments of the first aspect of the invention. It shall also be noted that all embodiments of the second aspect of the invention are applicable to and combinable with all embodiments of the first aspect of the invention and vice versa.

BRIEF DESCRIPTION OF THE DRAWINGS

With reference to the appended drawings, below follows a more detailed description of embodiments of the invention cited as examples.

In the drawings.

Figure 1:
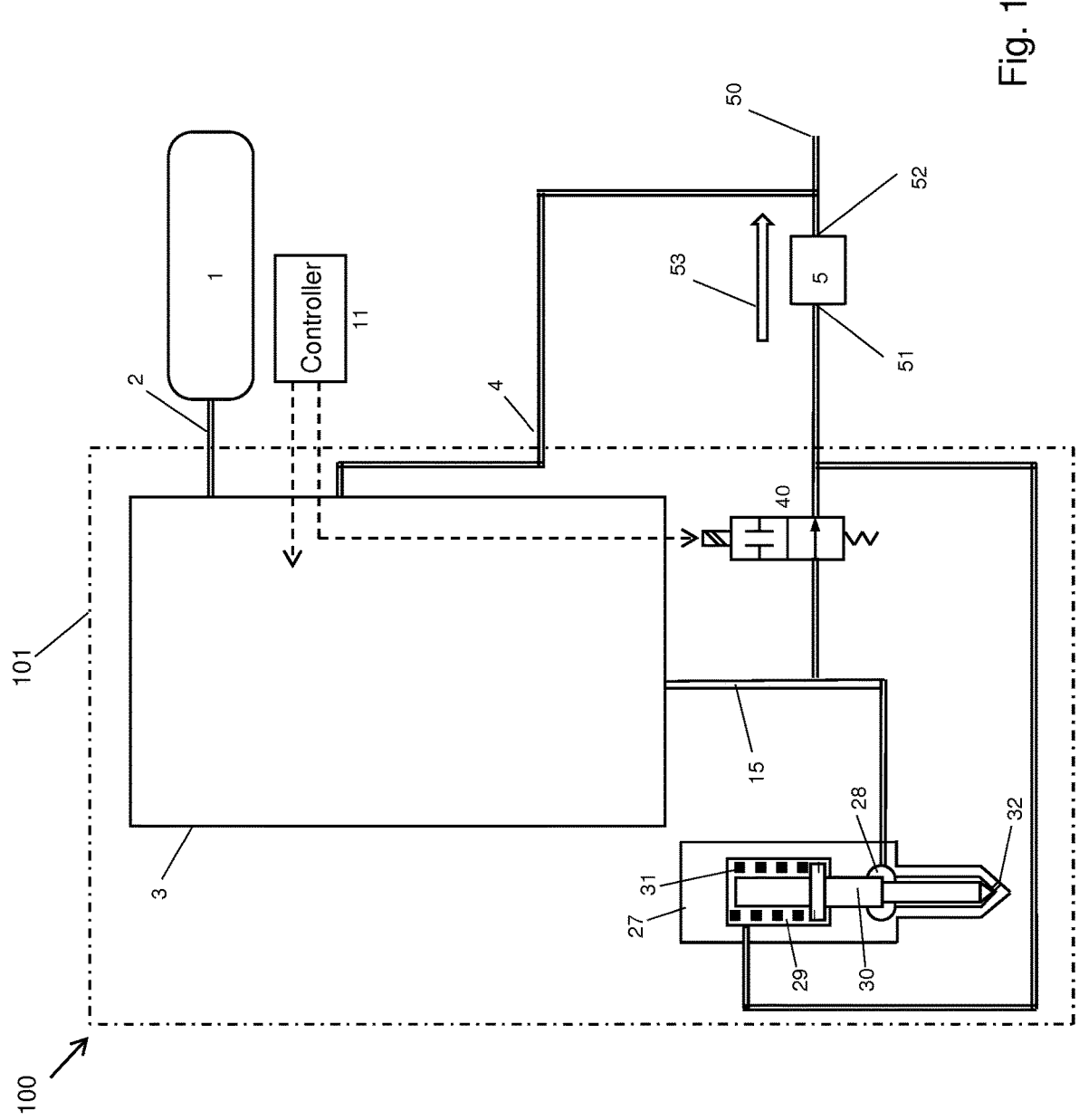
FIG. 1 shows a fuel injection system according to an embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

Embodiments of the present invention will now be described with respect to FIGS. 1-4 which show schematic sectional views of a fuel injection system 100 for an internal combustion engine (not shown). The internal combustion engine may be part of a vehicle (not shown), such as a truck, a bus, a passenger car and a construction equipment vehicle.

With reference to e.g. FIG. 1, a fuel injection system 100 for an internal combustion engine is shown. The system 100 comprises a first fuel source 1 for providing fuel of a relatively high pressure. It further comprises a return channel 50 connected to a second fuel source (not shown) for accommodating fuel of relatively low pressure in relation to the pressure of the fuel provided from the first fuel source 1. The second fuel source is preferably a fuel tank of the vehicle and/or the first fuel source is preferably fluidly connected to the fuel tank, whereby the fuel pressure in the first fuel source may be provided by a high-pressure pump which pumps fuel from the fuel tank.

Furthermore, the system 100 comprises a residual pressure regulator 5 comprising an inlet 51 and an outlet 52, which outlet 52 is connected to the return channel 50. The system 100 further comprises a fuel injector 101 comprising an inlet channel 2 connected to the first fuel source 1, a control valve arrangement 3 comprising an inlet, an outlet and a return port 4, whereby the inlet of the control valve arrangement 3 is connected to the inlet channel 2 and the outlet of the control valve arrangement 3 is connected to an outlet channel 15. The fuel injector 101 further comprises a fuel injection nozzle 27 comprising an outlet chamber 28 connected to the outlet channel 15, an injection outlet 32 connected to the outlet chamber 28 and a needle member 30, wherein the needle member 30 is at least partially provided in the outlet chamber 28 and biased at least partially by a biasing member 31 to a nozzle closed position whereby fluid communication between the outlet chamber 28 and the injection outlet 32 is blocked. The fuel injection nozzle 27 is configured such that the needle member 30 is biased to open fluid communication between the outlet chamber 28 and the injection outlet 32 by a pressure in the outlet chamber 28.

The fuel injection system 100 further comprises a spill valve 40 provided between the outlet channel 15 and the return channel 50, wherein the residual pressure regulator 5 is connected by its inlet 51 to the spill valve 40 and configured to regulate pressure at its inlet 51 to a residual pressure that is higher than the pressure in the return channel 50 but lower than the pressure of the first fuel source 1. Further, the return port 4 is connected to the return channel 50 downstream the residual pressure regulator 5, i.e. after the outlet 52 of the residual pressure regulator 5 as shown in e.g. FIG. 1. The arrow 53 shows the direction of the flow when it flows downstream towards the return channel 50. The spill valve 40 is configured to close the connection between the outlet channel 15 and the inlet 51 of the pressure regulator 5 during a fuel injection event, and to open the connection between consecutive fuel injection events. The opening and closing of the spill valve 40 is preferably performed by an electronic controller 11, which also, as shown, may be used for controlling the control valve arrangement 3.

The biasing member 31, which here is in the form of a coil spring, is provided in a fuel injection nozzle control chamber 29 of the fuel injection nozzle 27. The fuel injection nozzle control chamber 29 may be fluidly connected to the inlet 51 of the pressure regulator 5 downstream the spill valve 40. A pressure in the fuel injection nozzle control chamber 29 may bias the fuel injection nozzle 27 to a closed position.

The fuel injection nozzle 27 may be configured to open fluid communication between the outlet chamber 28 and the injection outlet 32 when the pressure in the outlet chamber 28 is at or above a predetermined nozzle opening pressure, and the residual pressure may be set lower than the predetermined nozzle opening pressure. The fuel injection nozzle 27 may further be configured to close when the pressure in the outlet chamber 28 is at or below a predetermined nozzle closing pressure, while the residual pressure may be set lower than the predetermined nozzle closing pressure. Thereby, the risk of leakage at the injection outlet 32 due to wear or damage of the fuel injection nozzle 27 may be reduced or prevented between consecutive fuel injection events.

Figure 2:
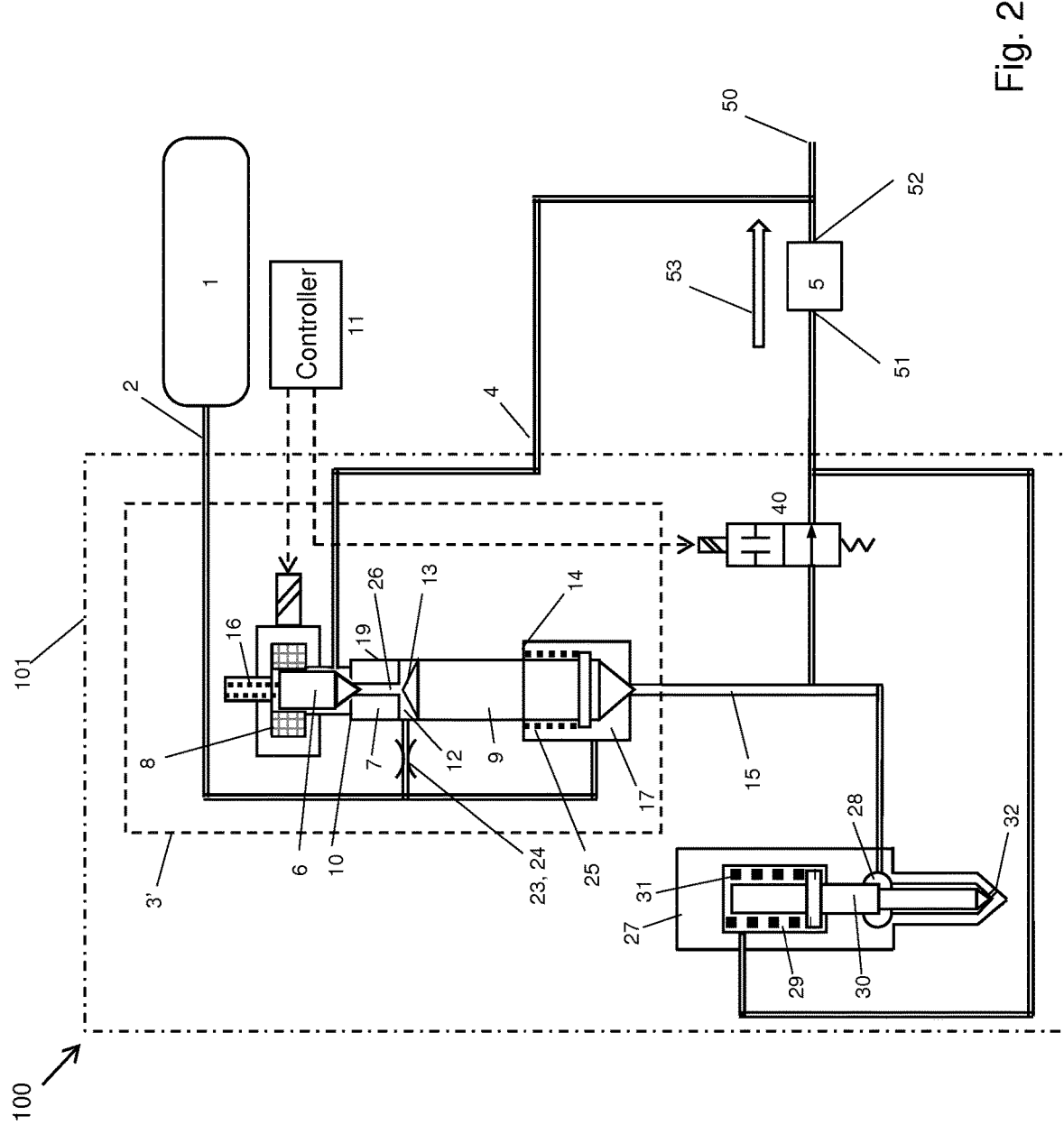
FIG. 2 shows a fuel injection system according to another embodiment of the present invention.

With respect to FIG. 2, a fuel injection system 100 is shown comprising a control valve arrangement 3' which comprises a nozzle control member 9 and a fuel outlet chamber 17 which connects the inlet and the outlet of the control valve arrangement 3', wherein the nozzle control member 9 is at least partially arranged in the fuel outlet chamber 17 and configured to be moveable for selectively allowing pressurized fuel into the outlet channel 15, wherein the control valve arrangement 3' further comprises a fuel control chamber 12 configured such that a pressure therein biases the nozzle control member 9 towards a closed position in which pressurized fuel is prevented from being allowed into the outlet channel 15. The fuel control chamber 12 is connected to the return port 4, wherein the control valve arrangement 3' further comprises a valve member 6 configured to be moveable for selectively opening and closing a flow passage 26 between the fuel control chamber 12 and the return port 4.

The control valve arrangement of FIG. 2 further comprises a biasing member 25 which biases the nozzle control member 9 towards a closed position in which fluid communication between the fuel outlet chamber 17 and the outlet channel 15 is prevented. The biasing member 25 is here a resilient member in the form of a coil spring. Further, in the shown embodiment, the coil spring 25 abuts an abutment surface 14 which is provided in the fuel outlet chamber 17.

The control valve arrangement 3' further comprises a moveable member 7, whereby at least the moveable member 7 and the nozzle control member 9 define the fuel control chamber 12. The moveable member 7 may for example be a piston member which is moveable, e.g. slidable, in a guide 19 of the control valve arrangement 3'. The guide 19 may for example be cylindrically formed, and arranged to accommodate at least the moveable member 7 and the nozzle control member 9, which preferably are coaxially arranged in the guide 19. The members 9 and 7 are closely matched to the guide 19 by its diameters so as to limit fluid leakage that may occur along the guide 19, which is dependent on the clearance between the guide 19 and the guided members 9 and 7 and on the pressure differences existing along the guide 19.

The moveable member 7 is configured to be moveable towards and away from the nozzle control member 9 and to raise pressure in the fuel control chamber 12 when moved towards the nozzle control member 9. Further, the valve member 6 is biased towards the moveable member 7 for closing the flow passage 26 and for moving the moveable member 7 towards the nozzle control member 9. The control valve arrangement 3' further comprises a fuel connection 23 between the inlet channel 2 and the fuel control chamber 12 for pressurizing the fuel control chamber 12. The fuel connection 23 preferably comprises a hydraulic restrictor 24 for restricting the flow of pressurized fuel from the inlet channel 2 to the fuel control chamber 12. The flow passage 26 is in the shown embodiment provided in the moveable member 7. More particularly, the flow passage 26 is here provided as a centrally placed bore in the moveable member 7 which extends in the longitudinal direction relative to the cylindrically formed guide 19.

The valve member 6 is biased towards the moveable member 7 by a second resilient member 16. The second resilient member 16 is here in the form of a coil spring. The valve member 6 and the second resilient member 16 are here part of a valve 8, which preferably is an electronically controlled valve such as a solenoid valve, controlled by a controller 11.

Still further, the control valve arrangement 3' comprises a first abutment surface 10, whereby the moveable member 7 is configured to be moved towards the first abutment surface 10 and to contact the first abutment surface 10 by a pressure rise in the fuel control chamber 12. Moreover, the first abutment surface 10 and the moveable member 7 are configured such that fuel leakage is minimized or prevented between the contacting surfaces of the first abutment surface 10 and the moveable member 7. Thus, the first abutment surface 10 may act as a valve seat when in contact with the moveable member 7, preventing a leakage of fuel from the fuel control chamber 12 past the guide 19 and out to the return port 4. Furthermore, the flow control system 1 is also configured so that when the moveable member 7 and/or the nozzle control member 9 are moved towards each other, a flow area between the fuel control chamber 12 and the flow passage 26 may be reduced, and thereby leakage from the fuel control chamber 12 to the return port 4 may be reduced.

For example, when the nozzle control member 9 is moved towards an open position in which the pressurized fuel is being allowed into the outlet channel 15, a portion 13 of the nozzle control member 9 reduces the flow area between the fuel control chamber 12 and the flow passage 26. Fuel leakage from the inlet channel 2 to the return port 4 can thereby be limited when the nozzle control member 9 is moved towards the open position and when it is in the fully open position. The portion 13 is in the shown embodiment cone-shaped and protrudes towards the moveable member 7 so that the apex of the cone will be received in the flow passage 26 when the nozzle control member 9 and the moveable member 7 are moved towards each other. This may lead to that the flow area between the fuel control chamber 12 and the flow passage 26 is hydraulically blocked when the members 7, 9 contact each other.

Figure 3:
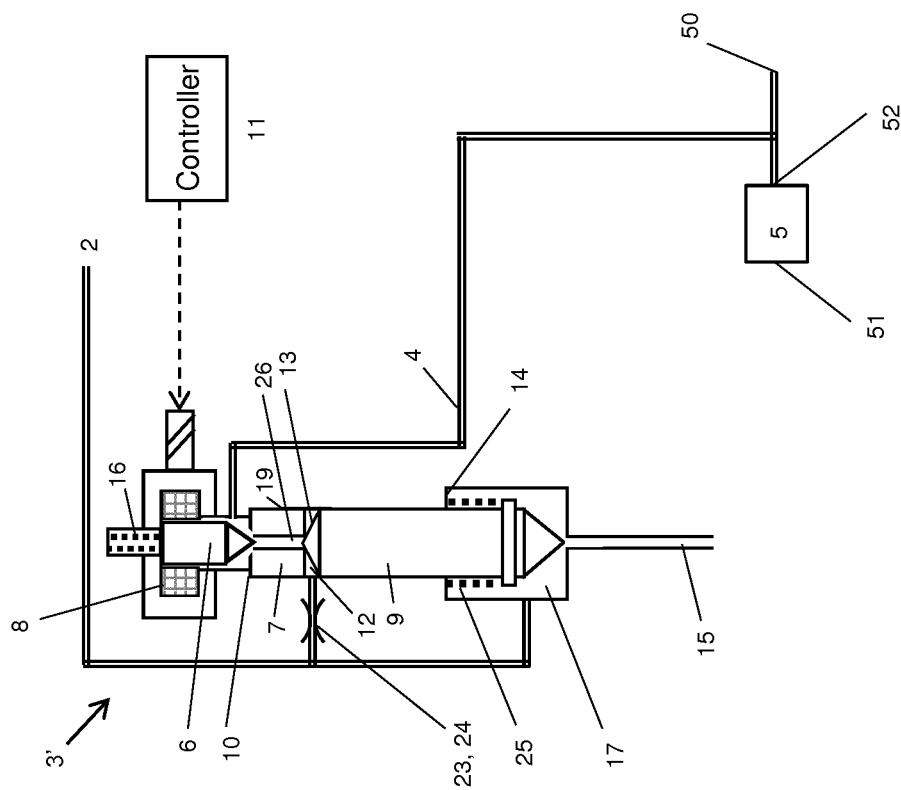
FIGS. 3 and 4 show a control valve arrangement according to an embodiment of the present invention.
Figure 4:
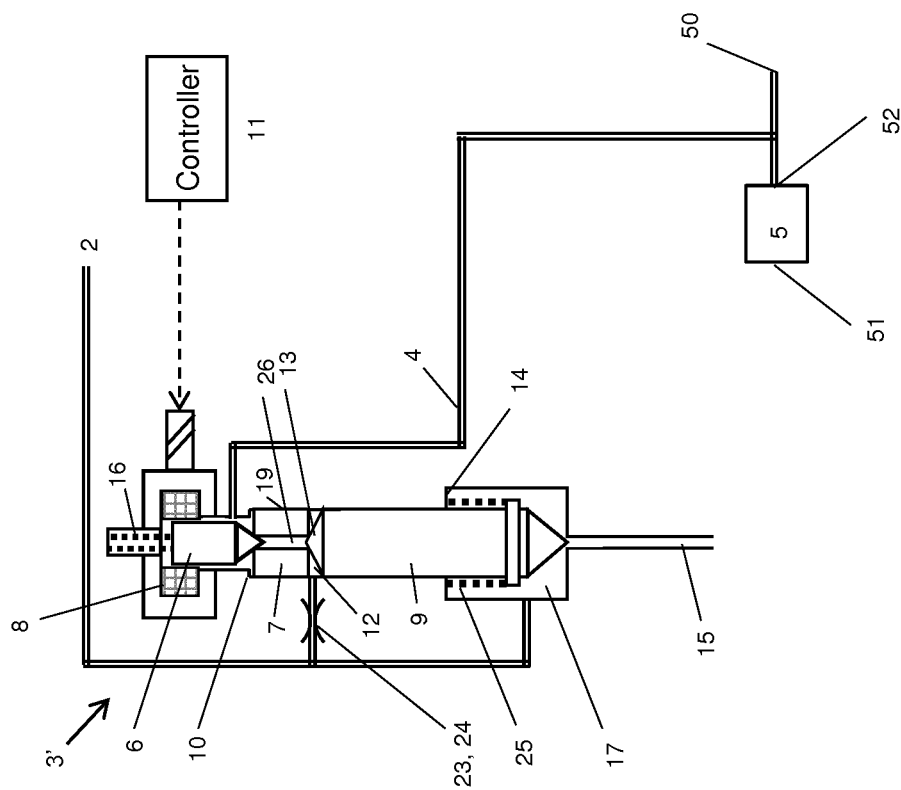

FIG. 2 and FIGS. 3-4 further show an example of an opening and closing sequence of the control valve arrangement 3' when the nozzle control member 9 is moved between its closed and open positions. Details of the fuel injection nozzle 27 have been omitted in FIGS. 3 and 4.

To initiate injection, a solenoid valve 8 is energized, which is controlled by the controller 11, and thereby the valve member 6 is attracted against the force of the spring 16. This opens the connection between the fuel control chamber 12 and the return port 4, see FIG. 3. The flow area of the flow passage 26, which is opened by the valve member 6, is configured to be sufficiently big to drop the pressure in the fuel control chamber 12. This may also be facilitated by use of the hydraulic restrictor 24 provided in the fuel connection 23, which restrictor 24 is configured to feed the fuel control chamber 12 with fuel with a predetermined feeding rate. This causes a positive pressure difference between the fuel outlet chamber 17 and the fuel control chamber 12, and the control valve arrangement 3' is adapted so that the positive pressure difference overcomes the force of the biasing member 25. This leads to that the nozzle control member 9 is moved from its closed position to an open position where the connection between the fuel outlet chamber 17 and the outlet channel 15 is opened. This causes fuel to flow from the inlet channel 2 to the outlet channel 15.

When the nozzle control member 9 moves upwards in the guide 19 towards the moveable member 7, the flow area between the fuel control chamber 12 and the flow passage 26 becomes restricted. This limits the flow of fuel from the inlet channel 2 via the fuel connection 23 and the fuel control chamber 12 out to the return port 4, and thus limits control leakage of the fuel injection system 100. This state is shown in FIG. 3.

To stop an injection, the solenoid valve 8 is de-energized, resulting in that the spring 16 makes the valve member 6 close the connection between the flow passage 26 and the return channel 4, see FIG. 4. This raises the pressure in the fuel control chamber 12. The pressure rise may happen relatively slowly due to the hydraulic restrictor 24. However, by the configuration of the fuel injection system 100, and especially by use of the moveable member 7, the response time may be improved. More particularly, the force of the spring 16 acting on the valve member 6 is transferred to the moveable member 7 when the valve member 6 and the moveable member 7 contact each other. Thereby the moveable member 7 is moved from its abutment surface 10 towards the nozzle control member 9, resulting in an extra pressure increase in the fuel control chamber 12. This shortens the time it takes for the nozzle control member 9 to begin its movement towards its closed position where the connection between the fuel outlet chamber 17 and the outlet channel 15 is closed. The closer the nozzle control member 9 is to its fully closed position, the bigger the throttling effect it creates resulting in a pressure reduction in the outlet channel 15. Since the pressure in the outlet channel 15 also acts on the nozzle control member 9 in the direction of its opening, the increasing throttling effect accelerates the closure of the nozzle control member 9. Thus, the closing is accomplished by the throttling effect and by the spring 25, while the pressure rise in the fuel control chamber 12 moves the moveable member 7 back to the abutment surface 10. Then the system 1 is brought back to its initial position as shown in FIG. 2, ready for the next injection cycle.

It is to be understood that the present invention is not limited to the embodiments described above and illustrated in the drawings; rather, the skilled person will recognize that many changes and modifications may be made within the scope of the appended claims.

The invention claimed is:

1. A fuel injection system for an internal combustion engine, comprising:
   a first fuel source for providing fuel of a relatively high pressure;
   a return channel connected to a second fuel source for accommodating fuel of relatively low pressure in relation to the pressure of the fuel provided from the first fuel source;
   a residual pressure regulator comprising an inlet and an outlet, which outlet is connected to the return channel;
   a fuel injector comprising an inlet channel connected to the first fuel source, a control valve arrangement comprising an inlet, an outlet and a return port, whereby the inlet of the control valve arrangement is connected to the inlet channel and the outlet of the control valve arrangement is connected to an outlet channel, wherein the fuel injector further comprises a fuel injection nozzle comprising an outlet chamber connected to the outlet channel, an injection outlet connected to the outlet chamber and a needle member, wherein the needle member is at least partially provided in the outlet chamber and biased at least partially by a biasing member to a nozzle closed position whereby fluid communication between the outlet chamber and the injection outlet is blocked, and wherein the fuel injection nozzle is configured such that the needle member is biased to open fluid communication between the outlet chamber and the injection outlet by a pressure in the outlet chamber; and
   wherein the fuel injection system further comprises:
   a spill valve provided between the outlet channel and the return channel, wherein the residual pressure regulator is connected by its inlet to the spill valve and configured to regulate pressure at its inlet to a residual pressure that is higher than the pressure in the return channel but lower than the pressure of the first fuel source, wherein further the return port is connected to the return channel downstream the residual pressure regulator such that a pressure level in the control valve arrangement during operation of the fuel injector is different from a pressure level in the fuel injection nozzle.

2. The fuel injection system according to claim 1, wherein the fuel injection nozzle is configured to open fluid communication between the outlet chamber and the injection outlet when the pressure in the outlet chamber is at or above a predetermined nozzle opening pressure, further wherein the residual pressure is set lower than the predetermined nozzle opening pressure.

3. The fuel injection system according to claim 1, wherein the fuel injection nozzle is configured to close when the pressure in the outlet chamber is at or below a predetermined nozzle closing pressure, further wherein the residual pressure is set lower than the predetermined nozzle closing pressure.

4. The fuel injection system according to claim 1, wherein the residual pressure is set to a level between 25 and 65 bar.

5. The fuel injection system according to claim 1, wherein the control valve arrangement further comprises a nozzle control member and a fuel outlet chamber which connects the inlet and the outlet of the control valve arrangement, wherein the nozzle control member is at least partially arranged in the fuel outlet chamber and configured to be moveable for selectively allowing pressurized fuel into the outlet channel, wherein the control valve arrangement further comprises a fuel control chamber configured such that a pressure therein biases the nozzle control member towards a closed position in which pressurized fuel is prevented from being allowed into the outlet channel, wherein the fuel control chamber is connected to the return port, and wherein the control valve arrangement further comprises a valve member configured to be moveable for selectively opening and closing a flow passage between the fuel control chamber and the return port.

6. The fuel injection system according to claim 5, wherein the control valve arrangement further comprises a moveable member, whereby at least the moveable member and the nozzle control member define the fuel control chamber.

7. The fuel injection system according to claim 6, wherein the moveable member is configured to be moveable towards and away from the nozzle control member and to raise pressure in the fuel control chamber when moved towards the nozzle control member, and wherein the valve member is biased towards the moveable member for closing the flow passage and for moving the moveable member towards the nozzle control member.

8. The fuel injection system according to claim 5, wherein the valve member is part of an electronically controlled valve.

9. The fuel injection system according to claim 5, further comprising a fuel connection between the inlet channel and the fuel control chamber for pressurizing the fuel control chamber.

10. The fuel injection system according to claim 9, wherein the fuel connection comprises a hydraulic restrictor for restricting the flow of fuel from the inlet channel to the fuel control chamber.

11. The fuel injection system according to claim 5, further comprising a biasing member biasing the nozzle control member towards its closed position.

12. A vehicle comprising the fuel injection system according to claim 1.

* * * * *